US010878171B2

(12) United States Patent
Madge et al.

(10) Patent No.: US 10,878,171 B2
(45) Date of Patent: Dec. 29, 2020

(54) GRAPHICAL USER INTERFACES FOR INTERACTIVE CONTENT PRESENTATION

(71) Applicant: Curriculum Associates, Inc., North Billerica, MA (US)

(72) Inventors: Nolan Madge, Ayer, MA (US); Sean Dearnaley, Bedford, MA (US); Jared Kazimir, Tarrytown, NY (US); Jarod Tavares, Winchendon, MA (US)

(73) Assignee: Curriculum Associates, LLC, North Billerica, MA (US)

( * ) Notice: Subject to any disclaimer, the term of this patent is extended or adjusted under 35 U.S.C. 154(b) by 60 days.

(21) Appl. No.: 16/216,870

(22) Filed: Dec. 11, 2018

(65) Prior Publication Data

US 2020/0184003 A1 Jun. 11, 2020

(51) Int. Cl.
| | | |
|---|---|---|
| *G06F 17/00* | (2019.01) | |
| *G06F 40/106* | (2020.01) | |
| *G09B 7/08* | (2006.01) | |
| *G06F 3/16* | (2006.01) | |
| *G06F 40/166* | (2020.01) | |

(52) U.S. Cl.
CPC ............ *G06F 40/106* (2020.01); *G06F 3/165* (2013.01); *G06F 40/166* (2020.01); *G09B 7/08* (2013.01)

(58) Field of Classification Search
CPC ...... G06F 40/106; G06F 40/166; G06F 40/14; G09B 7/08; G09B 7/04
See application file for complete search history.

(56) References Cited

U.S. PATENT DOCUMENTS

| | | | |
|---|---|---|---|
| 2005/0039130 A1* | 2/2005 | Paul | G06F 16/40 715/730 |
| 2005/0233296 A1* | 10/2005 | Ziv-el | G09B 7/02 434/350 |
| 2010/0011284 A1* | 1/2010 | Ramakrishna | G06F 16/958 715/234 |
| 2012/0258438 A1* | 10/2012 | Cohen | G09B 7/02 434/365 |
| 2015/0040006 A1* | 2/2015 | Gentile | G06F 3/0482 715/708 |

* cited by examiner

*Primary Examiner* — Andrew T McIntosh
(74) *Attorney, Agent, or Firm* — Wolf, Greenfield & Sacks, P.C.

(57) ABSTRACT

Systems and methods are described herein for presenting lesson content to a user. Lesson content and associated metadata are received and indicate a passage action that may be triggered during presentation of the lesson content to a user. At least some of the lesson content is presented to the user via a Hypertext Markup Language (HTML) document. One or more trigger events may be detected during presentation and, in response, the passage action is applied to the HTML document by: accessing display parameters indicating a visual effect and a portion of the lesson content associated with the passage action, generating an HTML container element, and modifying the HTML document to include the HTML container element. The modified HTML document is presented to the user.

26 Claims, 18 Drawing Sheets

637

Biiiig, Hungry Bears

Giant pandas live in forests in China. Bamboo grows there. Pandas spend many hours eating bamboo. Pandas are big bears, so they need to eat a lot.

This panda is eating bamboo.

637

Bilily, Hungry Bears

Giant pandas live in forests in China. Bamboo grows there. Pandas spend many hours eating bamboo. Pandas are big bears, so they need to eat a lot.

639C

This panda is eating bamboo.

637

Billig, Hungry Bears

Giant pandas live in forests in China. Bamboo grows there. Pandas spend many hours eating bamboo. Pandas are big bears, so they need to eat a lot.

This panda is eating bamboo.

637
Bilig, Hungry Bears

Giant pandas live in forests in China. Bamboo grows there. Pandas spend many hours eating bamboo. Pandas are big bears, so they need to eat a lot.   639E This panda is eating bamboo.

GRAPHICAL USER INTERFACES FOR INTERACTIVE CONTENT PRESENTATION

BACKGROUND

Hypertext Markup Language (HTML) is a markup language that enables the creation of interactive documents. HTML documents may published and disseminated to users via the Internet. HTML documents may be used to publish interactive content including, for example, educational content.

SUMMARY

According to some embodiments, at least one non-transitory computer-readable storage medium is provided. In some embodiments, the medium stores processor-executable instructions that, when executed by at least one computer hardware processor, cause the at least one computer hardware processor to perform: receiving, via at least one network, lesson content and associated metadata, the metadata indicating a plurality of passage actions that may be triggered during presentation of the lesson content to a user; presenting at least some of the lesson content to the user via an HTML document; detecting, during presentation of the at least some of the lesson content, a first trigger event for a first passage action of the plurality of passage actions; in response to detecting the first trigger event, applying the first passage action to the HTML document at least in part by: accessing display parameters associated with the first passage action, the display parameters indicating at least a first visual effect and a first portion of the at least some of the lesson content to which at least the first visual effect is to be applied; generating, using the display parameters, an HTML container element; and modifying the HTML document to include the HTML container element thereby obtaining a modified HTML document; and presenting the modified HTML document to the user.

In some embodiments, the HTML document comprises a webpage, and wherein the presenting comprises: presenting the webpage to the user using an Internet browser.

In some embodiments, including in any of the preceding embodiments, generating, using the display parameters, the HTML container element comprises: generating an HTML div element having parameters that will cause the HTML div element to visually contribute to display of at least the first visual effect when presented as part of the modified HTML document.

In some embodiments, including in any of the preceding embodiments, the processor-executable instructions further cause the at least one hardware processor to perform: detecting, during presentation of the at least some of the lesson content, a second trigger event for a second passage action of the plurality of passage actions; in response to detecting the second trigger event, applying the second passage action at least in part by: accessing second display parameters associated with the second passage action, the second display parameters indicating at least a second visual effect and a second portion of the at least some of the lesson content to which at least the second visual effect is to be applied; generating a second HTML container element using the second display parameters; and modifying the HTML document to include the second HTML container thereby obtaining a second modified HTML document; and presenting the second modified HTML document to the user.

In some embodiments, including in any of the preceding embodiments, the second portion at least partially overlaps the first portion of the at least some of the lesson content. In some embodiments, the second portion does not overlap with the first portion of the at least some of the lesson content.

In some embodiments, including in any of the preceding embodiments, for each of the plurality of passage actions, the metadata specifies at least one trigger event for the passage action.

In some embodiments, including in any of the preceding embodiments, the first trigger event indicates a first user input in response to which the first passage action is to be triggered, wherein the first passage action is applied in response to detecting the first user input.

In some embodiments, including in any of the preceding embodiments, the lesson content includes a question and the first trigger event comprises an incorrect answer to the question, wherein the first passage action is applied in response to detecting the incorrect answer to the question.

In some embodiments, including in any of the preceding embodiments, the first trigger event comprises a user's selection of a selectable display element, wherein the first passage action is applied in response to detecting the user's selection of the selectable display element.

In some embodiments, including in any of the preceding embodiments, the selectable display element is a button, a checkbox, a radio button, or a drop-down selector.

In some embodiments, including in any of the preceding embodiments, the lesson content includes an audio presentation, and wherein the first trigger event is the audio playback of a specified point in the audio presentation. In some embodiments, the lesson content includes an video presentation, and wherein the first trigger event is the audio playback of a specified point in the video presentation. In some embodiments, the first trigger event is a passage of a threshold amount of time after the presentation of a specified piece of content.

In some embodiments, including in any of the preceding embodiments, the first passage action is selected from the group of passage actions consisting of: displaying a container around at least a portion of the lesson content, causing at least a portion of the lesson content to be selectable by a user, causing at least a portion of lesson content to be movable by the user, animating at least a portion of the lesson content, highlighting at least a portion of the lesson content, revealing a hidden portion of the lesson content, underlining a portion of the lesson content, causing audio corresponding to at least a portion of the lesson content to be played, replacing at least a portion of the lesson content with an interactive display element, changing a color of at least a portion of the lesson content, and changing a background color of at least a portion of the lesson content.

In some embodiments, including in any of the preceding embodiments, the lesson content comprises text, and the first passage action is selected from the group of passage actions consisting of: displaying a container around the text, causing the text to be selectable by a user, causing the text to be movable by the user, animating the text, highlighting the text, revealing the text when the text is previously hidden from the user's view, underlining the text, causing audio corresponding to the text to be played, replacing the text with an interactive display element, changing color of the text, and changing a color in a background of the text.

In some embodiments, including in any of the preceding embodiments, the processor-executable instructions further cause the at least one computer hardware processor to perform: receiving, through a graphical user interface for authoring lesson content, user input indicating the plurality of passage actions and one or more associated trigger events. In some embodiments, the processor-executable instructions further cause the at least one computer hardware processor to perform: generating the metadata using the received user input indicating the plurality of passage actions and the one or more associated trigger events.

According to some embodiments, a system is provided. In some embodiments, the system comprises at least one computer-hardware processor; and at least one non-transitory computer-readable storage medium storing processor-executable instructions that, when executed by the at least one computer hardware processor, cause the at least one computer hardware processor to perform: receiving, via at least one network, lesson content and associated metadata, the metadata indicating a plurality of passage actions that may be triggered during presentation of the lesson content to a user; presenting at least some of the lesson content to the user via a Hypertext Markup Language (HTML) document; detecting, during presentation of the at least some of the lesson content, a first trigger event for a first passage action of the plurality of passage actions; in response to detecting the first trigger event, applying the first passage action to the HTML document at least in part by: accessing display parameters associated with the first passage action, the display parameters indicating at least a first visual effect and a first portion of the at least some of the lesson content to which at least the first visual effect is to be applied; generating an HTML container element using the display parameters; and modifying the HTML document to include the HTML container element thereby obtaining a modified HTML document; and presenting the modified HTML document to the user.

According to some embodiments, a method is provided. In some embodiments, the method comprises: receiving, via at least one network, lesson content and associated metadata, the metadata indicating a plurality of passage actions that may be triggered during presentation of the lesson content to a user; presenting at least some of the lesson content to the user via a Hypertext Markup Language (HTML) document; detecting, during presentation of the at least some of the lesson content, a first trigger event for a first passage action of the plurality of passage actions; in response to detecting the first trigger event, applying the first passage action to the HTML document at least in part by: accessing display parameters associated with the first passage action, the display parameters indicating at least a first visual effect and a first portion of the at least some of the lesson content to which at least the first visual effect is to be applied; generating an HTML container element using the display parameters; and modifying the HTML document to include the HTML container element thereby obtaining a modified HTML document; and presenting the modified HTML document to the user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not intended to be drawn to scale. For purposes of clarity, not every component may be labeled in every drawing. In the drawings.

DETAILED DESCRIPTION

Figure 1A:
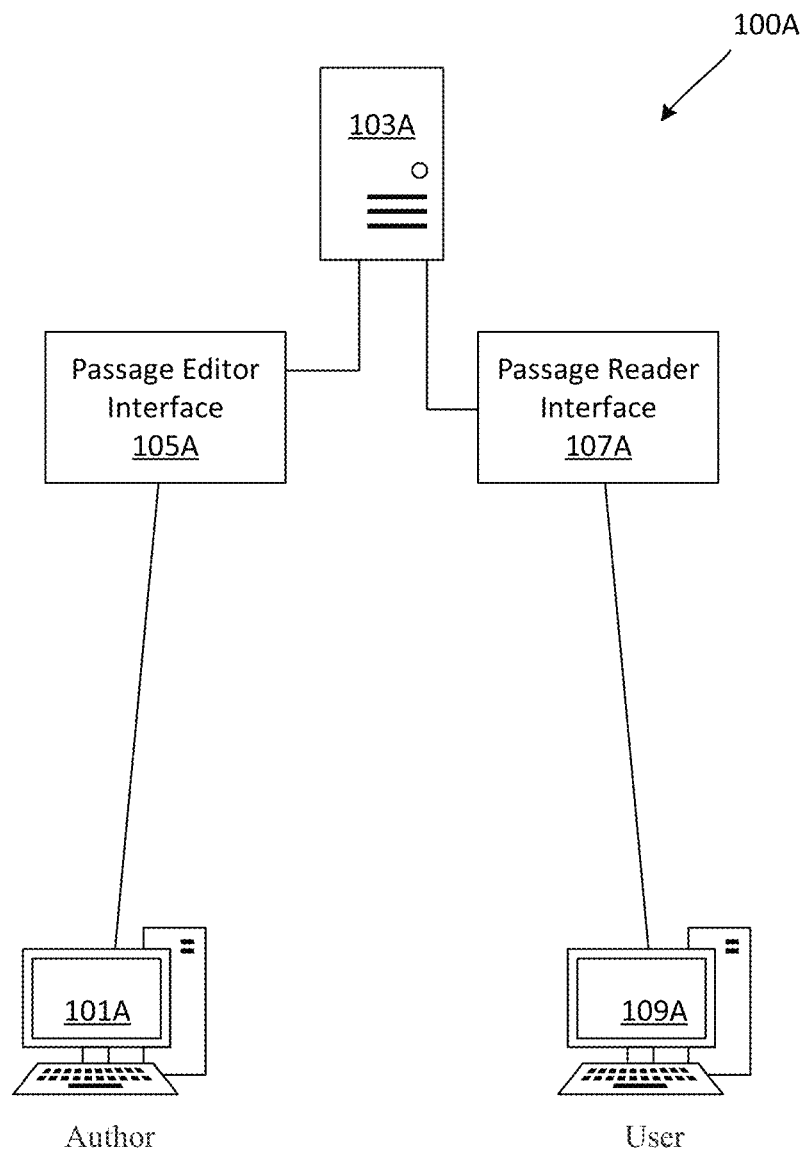
FIG. 1A shows an illustrative system for editing and displaying educational content, in accordance with some embodiments of the technology described herein.

The inventors have recognized and appreciated that conventional graphical user interface technology for authoring and presenting interactive educational content may be improved. When authoring and presenting educational content, it may be advantageous to visually distinguish some of the educational content from the rest of the content being presented, for example, via visually highlighting content, animating content, changing the font, typeface, and/or color of the content, changing a background color of the content, etc. Conventional lesson authoring and presentation systems implement such effects statically—e.g., by using HTML span elements—when the lesson is authored. The span elements indicate portions of the lesson content that are to be visually distinguished from the rest of the lesson content during display. Conventional systems require that such spans be included at the time the lesson content is being authored and the effect of a span might be turned on or off as needed when the lesson content is displayed. These static conventional approaches may not be created or deleted at runtime, and require programming expertise to correctly embed spans in the lesson content.

In addition, using HTML spans for visually highlighting content portions is undesirable because this conventional approach limits the ability to apply multiple different visual effects to the same portion of lesson content. The conventional approach to applying multiple effects involves using nested span elements, but this may introduce programming errors, ambiguity, and/or undesirable displays. When spans nest or overlap, conventional technologies do not allow the author to clearly indicate the beginning or end of each span. As a result, the effect to be applied to each portion of each span cannot be specified precisely, which may prevent the implementation of desired visual effects. For example, when nested span elements are used to specify that some text should be colored blue and that other text should be boldface as follows: "<span class="blue">Giant Pandas <span class="bold">live in </span> forests in China </span>," it is unclear where each span ends and, therefore, which portion of the text should be blue and which portion of the text should be bold.

To address these shortcomings of conventional GUI technology for authoring and presenting lesson content, the inventors have developed a technique for presenting lesson content using dynamically controllable HTML display elements. Static approaches include HTML code that is created when the text is authored. Such static code can be enabled or disabled to display or hide a visual effect, but the static elements are hard coded to remain in the HTML document in line with the text that the static element modifies. In contrast, dynamically controllable elements may be added or removed from the HTML document during user interactions. This allows for visual effects to be layered and positioned with ease and precision. Dynamically controllable elements may be associated with ranges of the HTML document to be modified. The modification may be presented to the user by adding or removing a layer to/from the display. For example, the div element may be dynamically created and inserted in an HTML document to incorporate a certain visual effect (such as highlighting) that affects a range of the HTML document, and the range may overlap with a range of another visual effect without overcomplicating the underlying HTML document.

Accordingly, some embodiments provide for a method for presenting lesson content that involves: (1) receiving, via at least one network, lesson content and associated metadata, the metadata indicating a plurality of passage actions that may be triggered during presentation of the lesson content to a user; (2) presenting at least some of the lesson content to the user via a Hypertext Markup Language (HTML) document; (3) detecting, during presentation of the at least some of the lesson content, a first trigger event for a first passage action of the plurality of passage actions; (4) in response to detecting the first trigger event, applying the first passage action to the HTML document at least in part by: (4a) accessing display parameters associated with the first passage action, the display parameters indicating at least a first visual effect and a first portion of the at least some of the lesson content to which at least the first visual effect is to be applied; (4b) generating, using the display parameters, an HTML container element; and (4c) modifying the HTML document to include the HTML container element thereby obtaining a modified HTML document; and (5) presenting the modified HTML document to the user (e.g., via a webpage through an Internet browser).

Accordingly, such embodiments improve interactive lesson content technology. The techniques described herein allow for dynamically modifying an HTML document including lesson content. In some embodiments, an author may generate lesson content that is associated with trigger events that cause passage actions to be performed to modify the lesson content. In some embodiments, the passage action may dynamically generate a display element, such as an HTML div element, that is positioned above a range of the lesson content indicated by the author. Such display elements may be generated as the lesson content is displayed, and the passage actions and triggers may be configured with a user interface instead of requiring programming expertise. Additionally, the display element may be layered above or below the lesson content, and the display may include any suitable number of layers. Specifying ranges for the passage actions and layering the display provide improved expressiveness and ease of use compared to the conventional techniques.

In some embodiments, the HTML document includes a webpage that is presented to the user using an Internet browser. In some embodiments, generating an HTML display element comprises: generating an HTML div element having parameters that will cause the HTML div element to visually contribute to display of at least one visual effect when presented as part of the modified HTML document.

In some embodiments, during presentation of the at least some of the lesson content, a second trigger event for a second passage action may be detected; in response to detecting the second trigger event, a second passage action may be applied at least in part by: accessing second display parameters associated with the second passage action, the second display parameters indicating at least a second visual effect and a second portion of the at least some of the lesson content to which at least the second visual effect is to be applied; a second HTML container element may be generated using the second display parameters; and the HTML document may be modified to include the second HTML container thereby obtaining a second modified HTML document; and the second modified HTML document may be presented to the user. In some embodiments, the ranges of the first and second display elements overlap. In some embodiments, the ranges do not overlap.

In some embodiments, for each of the plurality of passage actions, the metadata specifies at least one trigger event for the passage action.

In some embodiments, a first trigger event indicates a first user input in response to which a first passage action is to be triggered, wherein the first passage action is applied in response to detecting the first user input. In some embodiments, the lesson content includes a question and the first trigger event comprises an incorrect answer to the question, wherein the first passage action is applied in response to detecting the incorrect answer to the question. In some embodiments, the first trigger event comprises a user's selection of a selectable display element, wherein the first passage action is applied in response to detecting the user's selection of the selectable display element. In some embodiments, the selectable display element is a button, a checkbox, a radio button, or a drop-down selector. In some embodiments, the lesson content includes an audio presentation, and wherein the first trigger event is the audio playback of a specified point in the audio presentation. In some embodiments, the lesson content includes a video presentation, and wherein the first trigger event is the audio playback of a specified point in the video presentation. In some embodiments, the first trigger event is a passage of a threshold amount of time after the presentation of a specified piece of content.

In some embodiments, the first passage action is selected from a group of passage actions consisting of: displaying a container around at least a portion of the lesson content, causing at least a portion of the lesson content to be selectable by a user, causing at least a portion of lesson content to be movable by the user, animating at least a portion of the lesson content, highlighting at least a portion of the lesson content, revealing a hidden portion of the lesson content, underlining a portion of the lesson content, causing audio corresponding to at least a portion of the lesson content to be played, replacing at least a portion of the lesson content with an interactive display element, changing a color of at least a portion of the lesson content, and changing a background color of at least a portion of the lesson content.

In some embodiments, the lesson content comprises text, and the first passage action is selected from a group of passage actions consisting of: displaying a container around the text, causing the text to be selectable by a user, causing the text to be movable by the user, animating the text, highlighting the text, revealing the text when the text is previously hidden from the user's view, underlining the text, causing audio corresponding to the text to be played, replacing the text with an interactive display element, changing color of the text, and changing a color in a background of the text.

In some embodiments, user input indicating a plurality of passage actions and one or more associated trigger events may be received through a graphical user interface for authoring lesson content. In some embodiments, metadata may be generated using the received user input indicating the plurality of passage actions and the one or more associated trigger events.

Some embodiments of the technology described herein address some of the above-discussed drawbacks of conventional graphical user interface technology for authoring and presenting interactive educational content. However, not every embodiment addresses every one of these drawbacks, and some embodiments may not address any of them. As such, it should be appreciated that aspects of the technology described herein are not limited to addressing all or any of the above discussed drawbacks of conventional graphical user interface technology for authoring and presenting interactive educational content.

FIG. 1A shows an illustrative system 100A for editing and displaying lesson content, in accordance with some embodiments of the technology described herein. FIG. 1A illustrates computing device 101A, server 103A, passage editor interface 105A, passage reader interface 107A, and computing device 109A. It should be appreciated that although a limited number of computing devices are depicted in FIG. 1A, this is for clarity of illustration, and the technology described herein is not limited to the number of computing devices shown. The system 100A may be configured to perform the methods described herein including, for example, the methods described with reference to FIGS. 7, 8, and 9.

In some embodiments, the computing device 101A may be configured to allow an author of lesson content to interact with the system 100. Computing device 101A may be any suitable computing device, such as a laptop computer, a desktop computer, and/or any suitable computer or processing circuitry. The computing device may be configured to connect to the server 103A using any suitable network and network interface. For example, the computing device may be configured to connect with the server 103A over a suitable wired (e.g., Ethernet) or wireless (e.g., 802.11a/b/g/n/ac Wi-Fi) connection to the Internet to communicate with the server 103A.

In some embodiments, an author may draft, edit, save, and/or publish lesson content via the passage editor interface 105A. The lesson content may include text and/or audio-visual presentations to be displayed to a user. The lesson content may also include activities configured to receive user input (e.g., answers to questions in the lesson content). It should be appreciated that the lesson content may include any suitable content configured for user interactivity. In some embodiments, the passage editor interface includes a webpage or other interface hosted on the server 103A. For example, the server 103A may transmit one or more HTML pages that allow the author to interact, via computing device 101A, with lesson content (e.g., using one or more HyperText Transfer Protocol (HTTP) requests). In some embodiments, the passage editor interface 103A includes an application that is stored and executed on the computing device 101A. The passage editor interface 105A may be configured to enable the computing device 101A to specify and/or view lesson content to be edited, associate metadata with the lesson content, and transmit the edited lesson content and associated metadata to the server 103A and/or one or more users.

In some embodiments, server 103A may be configured to receive and store lesson content from the author and computing device 101A. Server 103A may use any suitable persistent and/or volatile memory to store (e.g., persistently or in a cache) the lesson content. Server 103A may be configured to host one or more webpages that include passage editor interface 105A and passage reader interface 107A. In some embodiments, lesson content may be stored by server 103A using any suitable schema and/or data structure, such as a relational database, a file system, a distributed file system, a key value store, and/or any suitable combination of storage techniques. For example, authors and lessons may have respective unique identifiers; an identifier of an author may be associated, in storage, with an identifier of lesson content, which may in turn be associated with one or more storage locations of the lesson content. Lesson content may be retrieved from memory to be edited (e.g., via passage editor interface 105A) by the author. Lesson content may also be retrieved from memory based on user interaction (e.g., received via passage reader interface 107A from the user computing device 109). In some embodiments, the server 103A may store indications of the history and/or progress of user interactions with lesson content.

In some embodiments, passage reader interface 107A may be any suitable interface for displaying lesson content to a user and/or receiving input from the user. In some embodiments, passage reader interface 107A includes a webpage or other interface hosted on server 103A. For example, server 103A may transmit one or more HTML pages that allow the user to interact, via computing device 109A, with lesson content (e.g., using one or more HyperText Transfer Protocol (HTTP) requests). In some embodiments, the passage reader interface 107A includes an application that is stored and executed on computing device 109A. Passage reader interface 107A may be configured to enable computing device 109A to specify desired lesson content, retrieve the desired lesson content from server 103A, provide input to interact with the lesson content, and/or receive modified lesson content based on the input. In some embodiments, the passage reader interface 107A may be part of the same software package as the passage editor interface 105A. For example, in such embodiments, the passage reader interface 107A and the passage editor interface 105A may be different modes of a program, such that the program is configured to allow editing in a first mode corresponding to the passage editor interface 105A and allow playback/interactivity (but not editing) in a second mode corresponding to the passage reader interface 107A.

In some embodiments, passage reader interface 107A includes an audio-visual display for presenting lesson content. For example, passage reader interface 107A may include instructions for playing audio included in or associated with the lesson content. In some embodiments, passage reader interface 107A may be configured to output (e.g., directly or indirectly to speakers) audio that corresponds to text in the lesson content. In such embodiments, as non-limiting examples, the audio may be pre-recorded or the audio may be generated by suitable text-to-speech techniques. In some embodiments, passage reader interface 107A may be configured to display suitable video content. Passage reader interface 107A may also be configured to modify the display of the lesson content based on the audio-visual display. For example, the display may be modified based on a trigger corresponding to a certain point in time in the audio-visual presentation. As a non-limiting example, passage reader interface 107A may highlight text as the text is rendered as speech, or highlight a range of text at a predetermined time. As a further non-limiting example, passage reader interface 107A may modify the display by revealing a portion of the lesson content (e.g., by removing an obfuscating overlay) at a predetermined point in audio-visual playback. In some embodiments, passage reader interface 107A receives user input and modifies the display based on the lesson content and associated metadata specified by the author of the lesson content. As a non-limiting example, passage reader interface 107A may receive a user input indicating an answer to a question in the lesson content, and passage reader interface 107 may modify the display based on whether the answer is correct or incorrect according the metadata specified by the author.

In some embodiments, computing device 109A may be configured to allow a user to view and interact with lesson content via passage reader interface 107A. Computing device 109A may be any suitable computing device, such as a laptop computer, a desktop computer, and/or any suitable computer or processing circuitry. The computing device 109A may be configured to connect to server 103A using any suitable network and network interface. For example, the computing device 109A may be configured to connect with the server 103A over a suitable wired (e.g., Ethernet) or wireless (e.g., 802.11 Wi-Fi) connection to the Internet. The computing device 109A may be configured to receive and transmit user input, which may be any suitable inputs, such as keyboard, mouse, or touchscreen inputs, voice commands, gesture-based commands, or any suitable inputs.

Figure 1B:
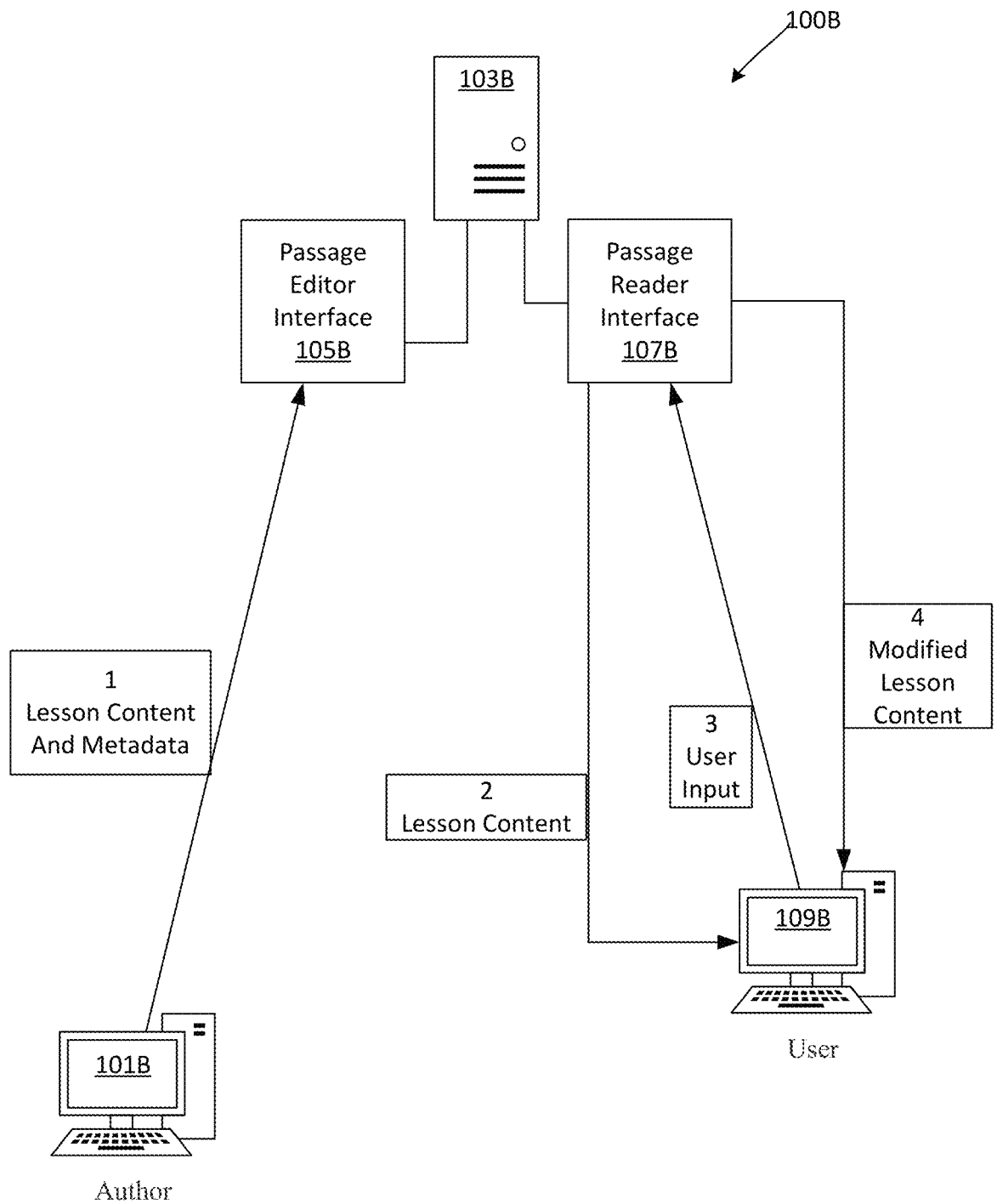
FIG. 1B shows an illustrative system for editing and displaying educational content, in accordance with some embodiments of the technology described herein.

FIG. 1B shows an illustrative system 100B for editing and displaying lesson content, in accordance with some embodiments of the technology described herein. FIG. 1B illustrates computing device 101B, server 103B, passage editor interface 105B, passage reader interface 107B, and computing device 109B, which may operate for example as was described with reference to the corresponding components of FIG. 1A. FIG. 1B further illustrates acts 1, 2, 3, and 4 related to inputting and transmitting data, via one or more networks, between the components of the system 100B.

At act 1, the author, via computing device 101B, may input lesson content and metadata into the passage editor interface 105B. The lesson content may include any suitable text, audio, and/or video to be displayed to one or more users. In some embodiments, the lesson content may be formatted to be included in and/or displayed via an HTML document.

In some embodiments, the author may also specify metadata that is associated with the lesson content. The metadata may include passage actions to be performed during the presentation of the lesson content to a user and/or in response to user input. Exemplary passage actions are described throughout the disclosure including with reference to FIGS. 6A-E. In some embodiments, multiple passage actions may be applied to a same passage of lesson content. In such embodiments, the passage actions may be applied to overlapping or disjoint portions of the passage. As discussed above, conventional techniques do not allow for application of different passage actions to overlapping passage portions. In some embodiments, a second action may remove or modify the effect of a second action, which may have been previously performed or is yet to be performed. In some embodiments, the lesson content may be input using a user interface without the direct input of HTML or other programming instructions. For example, the passage editor interface 105B may allow the author to select from predetermined actions and associated trigger events to be included in the lesson content.

In some embodiments, at act 2, the lesson content is displayed to the user via passage reader interface 107B. The user may log in to the server 103B using a user id and/or password. The user may request or be associated with the lesson content. In some embodiments, the lesson content may be displayed via a webpage provided to the computing device 109B.

In some embodiments, at act 3, the user provides input, via computing device 109B and passage reader interface 107B. The lesson content may be configured such that the user may provide inputs to interact with the lesson content. For example, the user may initiate, stop, and/or pause the display of the lesson content. In this example, the user may provide an input causing an audio-visual presentation to begin or stop playing. In some embodiments, the lesson content may include user input elements. In such embodiments, user input elements may include clickable/selectable buttons (e.g., represented by icons). In some embodiments, the user input elements may represent text boxes or radio buttons that may be configured to receive an answer to a question posed in the lesson content.

In some embodiments, in response to the user input, at act 4, modified lesson content may be transmitted and displayed to the user. In some embodiments, the modification may be made by instructions executing on client computing device 109 or by server 103B. The lesson content may be modified based on the metadata that is associated with the lesson content. In some embodiments, the user input may include a trigger event, and, in response, a passage action associated with the trigger event may be performed. In order to perform the passage action, passage reader interface 107B may generate a modified HTML document including a visual effect specified by the metadata. In some embodiments, passage reader interface 107B may generate a container element, such as an HTML div element, the includes an element (e.g., display elements configured with cascading style sheets (CSS)) to be included in the modified display. In some embodiments, the display container element may be displayed in a layer of the display that is above or below the lesson content. For example, an HTML div may be generated to include CSS generating a highlighting effect, and the div may be displayed above the lesson content to highlight a portion of text in the lesson content for the user. In some embodiments, the div element may be generated based on a passage action and deleted based on a passage action, which may be the same passage action.

For example, the metadata may include information specifying a passage action, the information indicating a type of action to be performed and a range of the passage (e.g., a portion of the passage) that the action is configured to be applied to. The range may be specified as an offset from the beginning of the passage and a length of the range, or with any suitable coordinate system such as a beginning position and an ending position. For example, a passage with 280 characters may have an action that is configured to be applied to the characters between the $50^{th}$ character and the $150^{th}$ character. In some embodiments, the passage reader interface 107 may generate a display element, such as an HTML div or span element, and use the HTML document object model to determine a bounding box, or other suitable visual container, that includes the desired range in the display. Determining such a bounding box allows for visual effects to be applied dynamically to any display and does not limit the visual effects to being in-line with the text. In some embodiments, a display element used to determine a bounding box may be separate from the display element used to include a visual effect and/or may be deleted once the bounding box is determined. In some embodiments, passage reader interface 107B may add, edit, or remove passage actions and visual effects based on other passage actions.

In some embodiments, a first passage action may be applied to a first range, and a second passage action may be applied to a second range. In some embodiments, the dynamically generated HTML container elements corresponding to each effect may be positioned in terms of a position in the display (e.g., a bounding box) rather than a position in the lesson content (e.g., in contrast to a span element that is positioned as being between two characters of content). Since the container elements may be instantiated independently from the content (e.g., in a portion of the modified HTML document that is separate from the content) the container elements may be configured to overlap. Each of the overlapping container elements may be configured to occupy a respective layer of the display. This improves upon the problem of nested and/or overlapping spans discussed above.

Figure 2:
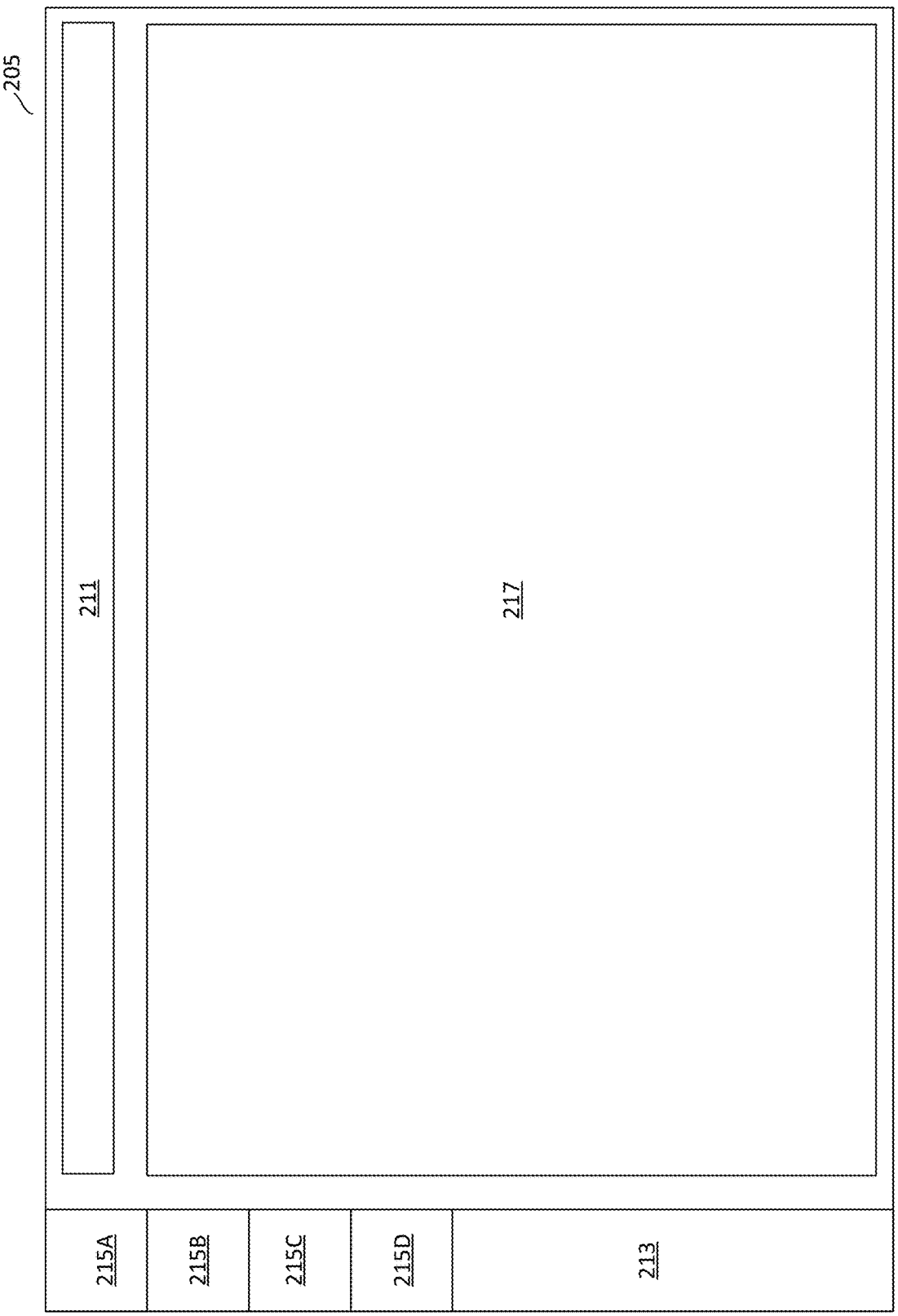
FIG. 2 shows an illustrative passage editor interface for configuring lesson content, in accordance with some embodiments of the technology described herein.

FIG. 2 shows an illustrative passage editor interface 205 for configuring lesson content, in accordance with some embodiments of the technology described herein. FIG. 2 illustrates passage editor interface 205, which includes top menu 211, side menu 213, passage tabs 215A, B, C, and D, and display area 217. It should be appreciated that although a particular layout is depicted in FIG. 2, the technology described herein is not limited to the configuration of the passage editor interface shown. Passage editor interface 205 may operate as was described with reference to the passage editor interface 105 in FIGS. 1A and 1B. Passage editor interface 205 may be implemented as a webpage and/or program instructions executing on a client computing device.

In the example of FIG. 2, top menu 211 may include any suitable user interface elements. In some embodiments, top menu 211 may include input elements that allow an author to navigate through passage editor interface 205, publish lesson content, preview lesson content, export/download lesson content, save lesson content on a server, and/or perform any other suitable function. In some embodiments, the author may provide input to top menu 211 in order to retrieve particular lesson content for editing.

In the example of FIG. 2, the side menu 213 includes passage tabs 215A-D. The lesson content may include multiple passages. For example, passage tabs 215A-D may correspond to an introductory passage, two passages within a lesson, and a concluding passage. Side menu 213 may include inputs that allow the author to add or remove one or more passage to the lesson content. In response to a user selection of any of passage tabs 215A-D, the display area may display be populated with information related to the selected passage.

In the example of FIG. 2, display area 217 may include any suitable user interface components for editing one or more passages. In some embodiments, the display area may include suitable user interface components for receiving user input to define lesson content characteristics (e.g., a title), add lesson content, define one or more passage actions to be included in metadata, and define one or more trigger events to be associated with each of one or more of the passage action(s). In some embodiments, display area 217 may display a preview of the lesson content that will be displayed to the user(s).

In some embodiments, the author may specify any of multiple trigger events. For example, a passage action may be triggered at the beginning of displaying the lesson content, at the beginning of playback of the lesson content, for any or each of a sequence of correct or incorrect answers, after passage of a predetermined period of time, and/or at any suitable time in the playback of an audio-visual presentation.

Figure 3:
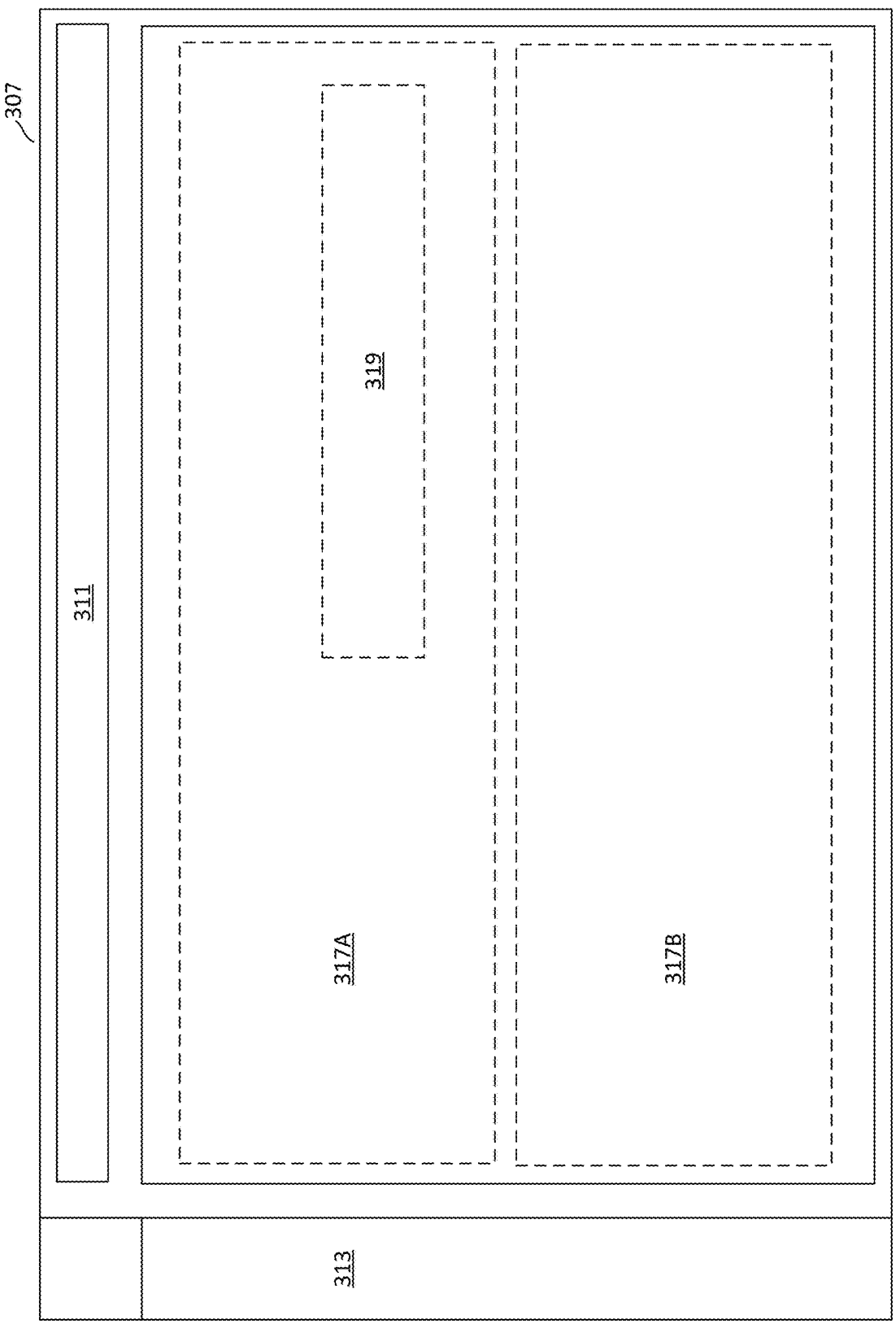
FIG. 3 shows an illustrative passage reader interface for displaying lesson content, in accordance with some embodiments of the technology described herein.

FIG. 3 shows an illustrative passage reader interface 307 for displaying lesson content, in accordance with some embodiments of the technology described herein. FIG. 3 illustrates passage reader interface 307, which includes top menu 311, side menu 313, display areas 317A and 317B, and display element 319. It should be appreciated that although a particular layout is depicted in FIG. 3, the technology described herein is not limited to the configuration of the passage reader interface 307 shown. Passage reader interface 307 may operate as was described with reference to the passage reader interfaces 107A&B in FIGS. 1A&B. Passage reader interface 307 may be implemented as a webpage and/or program instructions executing on a client computing device.

In the example of FIG. 3, top menu 311 may allow the user to input login information, navigate between lesson content, export lesson content, and/or provide any other suitable input. Side menu 313 may be configured to receive user input navigating the lesson content. For example, the side menu 313 may include a table of content for the lesson content (e.g., selectable passage tabs) or chart user progress through the lesson content.

In the example of FIG. 3, display area 317A is configured to display lesson content. The display area 317A may be configured to display text. In some embodiments, the display area may be configured to display images and/or may include an audio-visual player. Display area 317B may also be configured to display lesson content. In some embodiments, display area 317B may be configured to receive user input, such as one or more responses to a question. For example, the display area 317B may include a radio button, with each selectable option corresponding to an answer to a multiple choice question.

In response to the user input, the passage reader interface 307 may determine whether a trigger event was activated, and a corresponding visual effect may be added to the lesson content via display element 319. For example, display area 317A may display an HTML document, and the display element 319 may be an HTML div element including CSS. In some embodiments, the position of display element 319 may correspond to a range specified by the author in the metadata associated with the passage action.

Figure 4A:
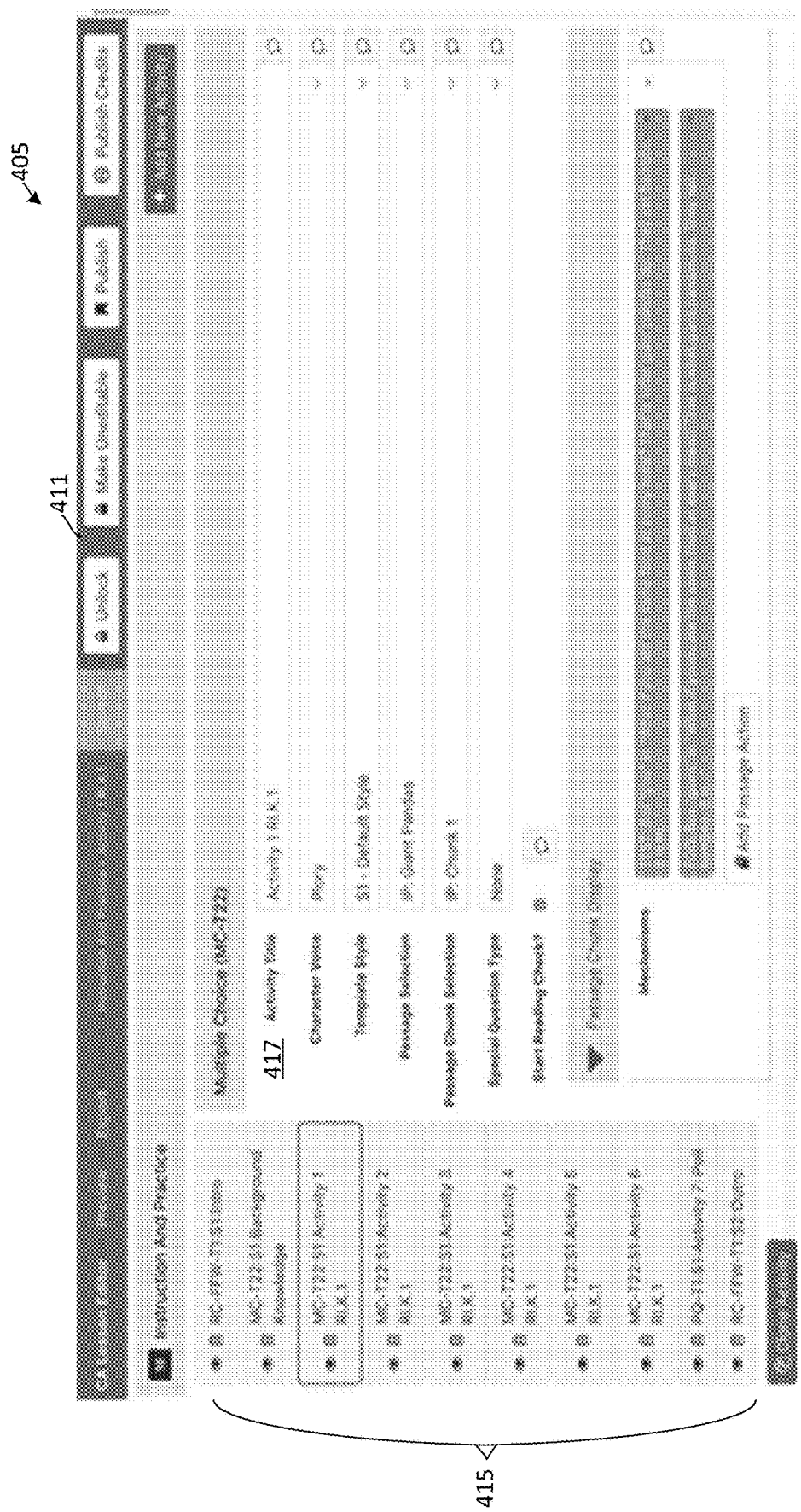
FIGS. 4A-B show screenshots of an illustrative passage editor interface for configuring lesson content, in accordance with some embodiments of the technology described herein.

FIG. 4A shows an illustrative passage editor interface 405 for configuring lesson content, in accordance with some embodiments of the technology described herein. FIG. 4A illustrates passage editor interface 405, which includes top menu 411, side menu 413, passage tabs 415, and display area 417. It should be appreciated that although a particular layout is depicted in FIG. 4, the technology described herein is not limited to the configuration of the passage editor interface shown. Passage editor interface 405 may operate as was described with reference to the passage editor interfaces 105A and 105B and 205 in FIGS. 1A and 1B and 2. Passage editor interface 405 may be implemented as a web interface (e.g., using one or more webpages being presented through an Internet browser), as a standalone program executing on a client computing device (e.g., an application program, an app, etc.), or in any other suitable way.

In the example of FIG. 4A, top menu 411 includes multiple selectable buttons. For example, the author may preview the lesson content by selecting a preview button. The author may export the lesson content by selecting an export button. The lesson content may be exported in any suitable format, such as one or more HTML documents, a slideshow, and/or an audio-visual presentation. The author may also publish the lesson content by selecting a publish button, which will indicate to a server that the lesson content may be transmitted to users.

In some embodiments, the lesson content may include multiple passages and/or activities, each of which may be represented by the passage tabs 415. The author may select a passage tab to populate the display area with information and an interface for editing the passage/activity corresponding to the selected passage tab.

In the example of FIG. 4A, the display area 417 includes multiple fields for receiving user input for configuring the passage being edited. For example, the author may provide a title, a portion of the passage, presentation styles, questions for the user, passage action, and/or trigger events.

Figure 4B:
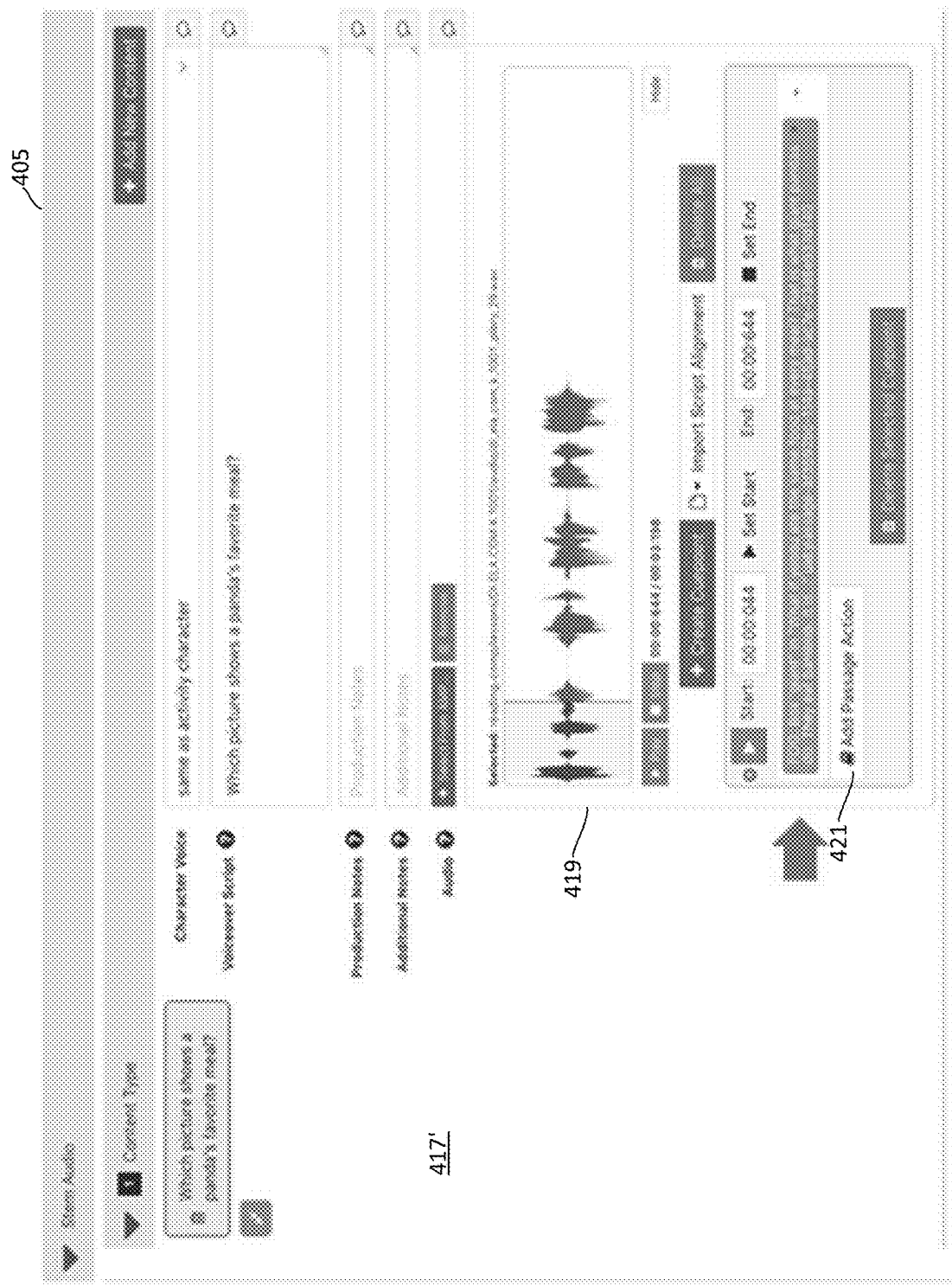

In FIG. 4B, the display area 417 further includes and audio-visual configuration 419 and a passage action input 421. The audio-visual configuration 419 may be configured to allow the author to configure the playback of an audio-visual presentation. For example, the author may select points to be trigger events. Passage action input 421 may be configured to cause a menu for creating a passage action to be displayed.

FIGS. 5A-D shows an illustrative passage action editor 531 for configuring passage actions, in accordance with some embodiments of the technology described herein. The passage action editor may be displayed in response to a user selection of the passage action input 421.

Figure 5A:
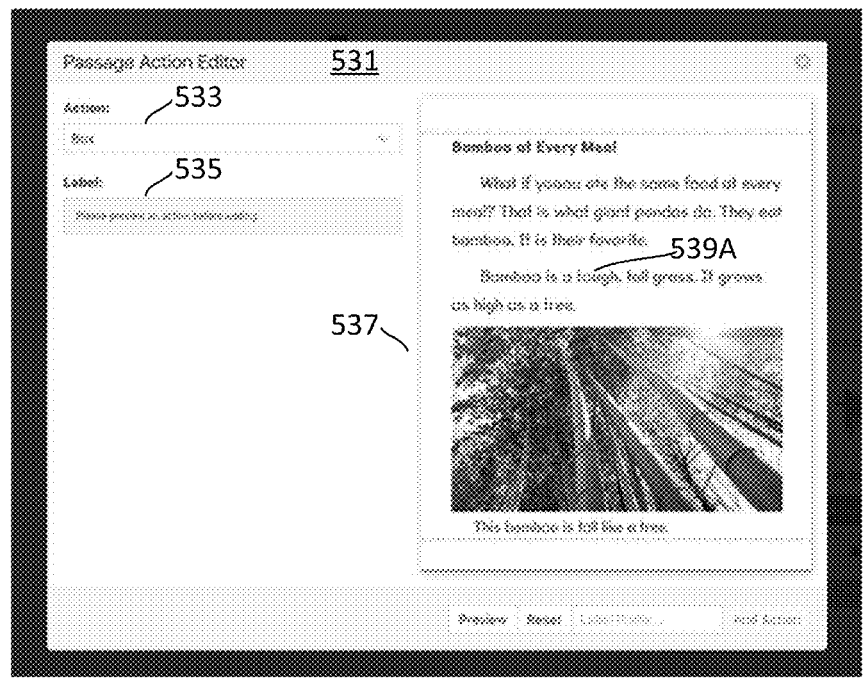
FIGS. 5A-D show screenshots of an illustrative passage action editor for configuring passage actions, in accordance with some embodiments of the technology described herein.

In FIG. 5A, passage action editor 531 includes an action input 533, a label field 535, a passage preview 537, and a visual effect 539A. In the example shown, the visual effect 539A is the result of a previously created passage action. The user may select one of multiple types of passage actions from action input 533. Passage preview 537 shows a preview of the lesson content that will be displayed to the user.

Figure 5B:
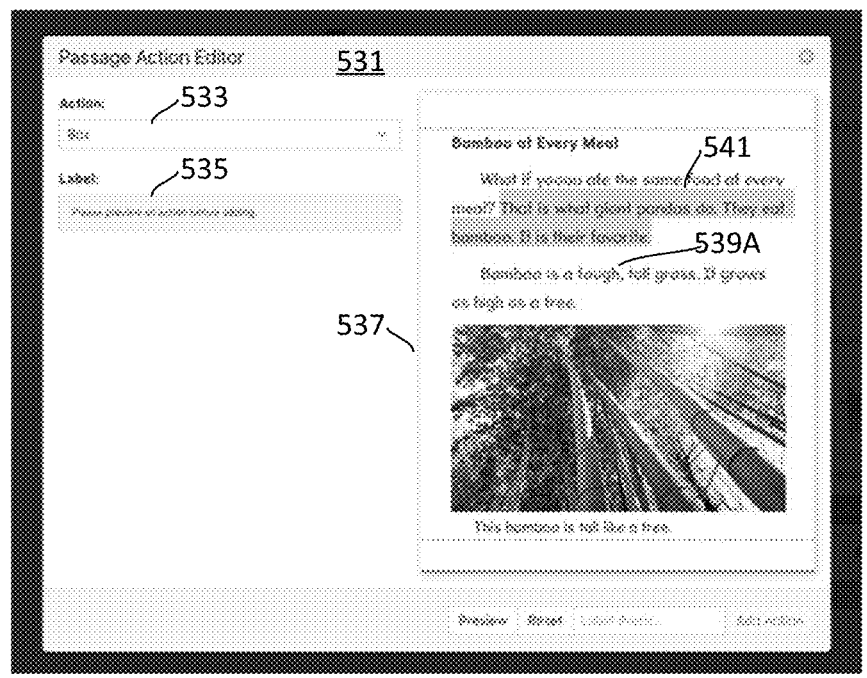

In FIG. 5B, the author selects a range 541 of the passage. The passage range 541 may be specified using any suitable user input. For example, the user may click and drag a cursor over the desired range. In some embodiments, the user may specify an offset and length of the range or a beginning and end of the range numerically. The passage range 541 may be associated with a visual effect that will corresponds to the action selected in action input 533.

Figure 5C:
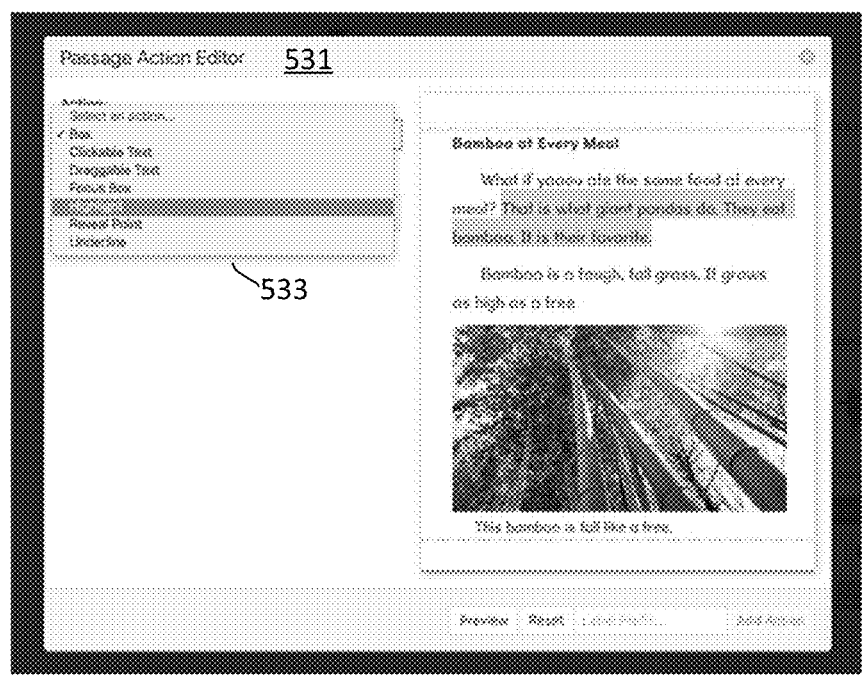
Figure 5D:
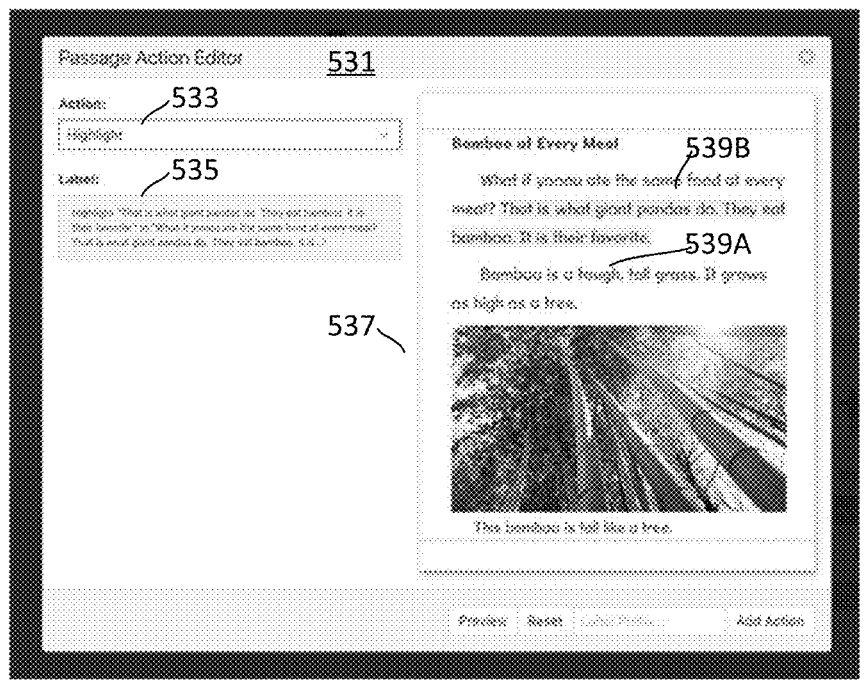

In FIG. 5C, action input 533 is expanded as a dropdown menu including multiple selectable visual effects. In FIG. 5D, the highlight effect has been selected in the action input 533. The passage preview 537 has been updated, relative to previous FIGS., to include the visual effect of highlighting the range corresponding to passage range 541. Label field 535 has also been populated with a description of the action. Label field 535 may be generated without user input or may be configured by the user.

Figure 5E:
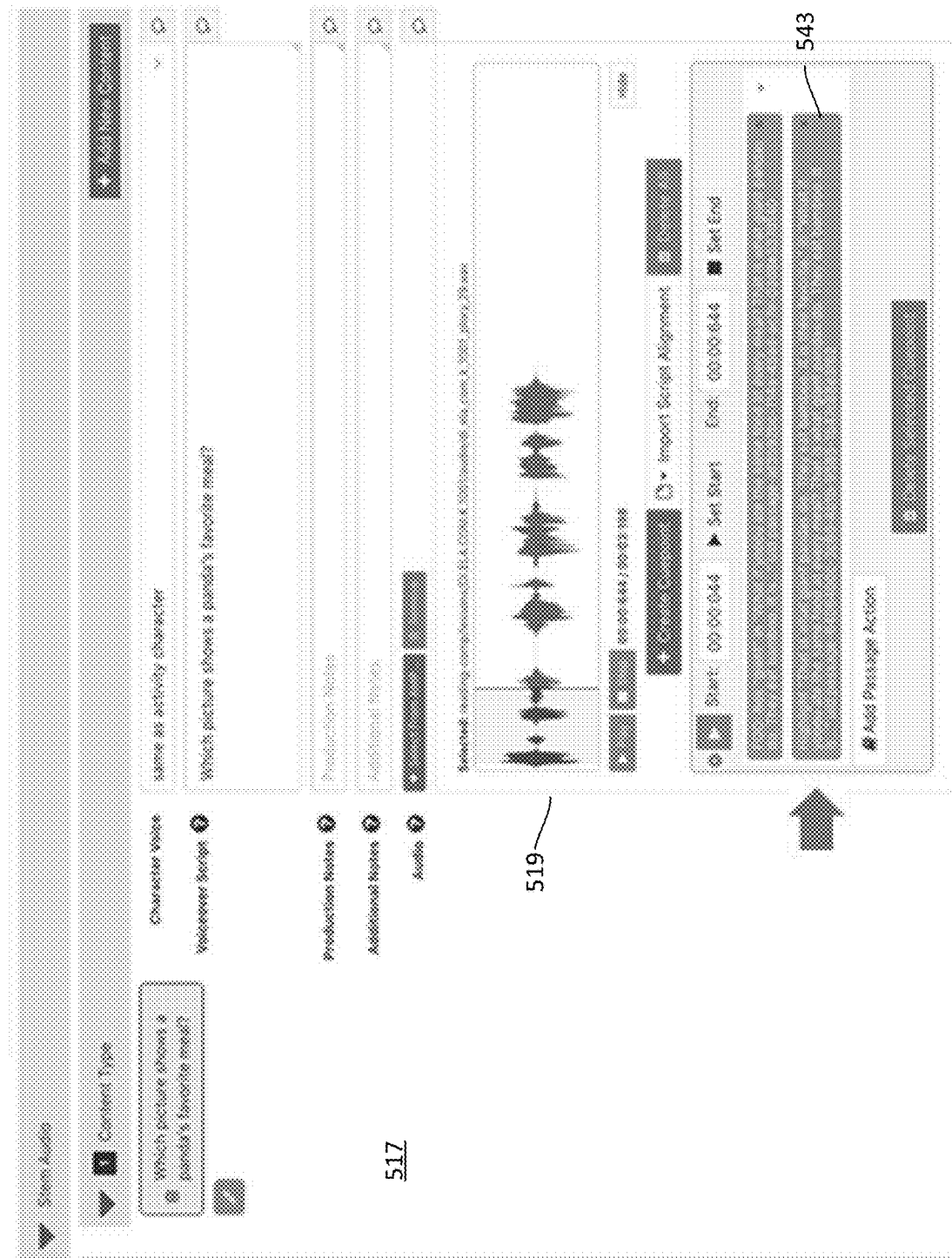
FIG. 5E shows a screenshot of an illustrative passage editor interface that corresponds to the passage editor interface described with reference to FIG. 4B.

FIG. 5E shows an illustrative passage editor interface that corresponds to the passage editor interface described with reference to FIG. 4B. The display area 517 has been updated to include the label from the label field 535 that corresponds to the action configured in the passage action editor 531. The author has added the action to the lesson content.

Figure 6A:
FIGS. 6A-E illustrate visual effects that may be generated by performing passage actions, in accordance with some embodiments of the technology described herein.

FIGS. 6A-E show illustrative visual effects that may be generated by performing passage actions, in accordance with some embodiments of the technology described herein. FIGS. 6A-E are described with reference to a same passage 637 as a non-limiting example. In FIG. 6A, a box 639A has been added to border the image in the passage 637. Any suitable bounding geometric shape may be used. It should be appreciated that the range associated with any visual effect may include text, images, audio-visual displays, and/or any of the preceding display elements.

Figure 6B:

FIG. 6B shows a focus box 639B. The focus box 639B may be used to focus a student's/user's attention to a particular portion of text (e.g., in response to a wrong answer or to emphasize an important passage). The focus box 639B may be implemented in a new layer of the display separate from the lesson content.

Figure 6C:
Figure 6D:
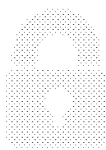
Figure 6E:

FIG. 6C shows highlighting 639C. The Highlighting may be overlaid on top of an author specified range of text. FIG. 6D shows a reveal point 639D. A portion of the lesson content may be hidden in a layer underneath the reveal point 639D. A passage action may add or delete the reveal point 639D at any suitable points. FIG. 6E shows underlining 639E, which causes the interface to underline a range of text.

The techniques developed by the inventors allow for the authoring and presentation of additional visual effects not described with reference to FIGS. 6A-E. For example, a portion of the lesson content may be indicated as being clickable by the user and/or a portion of lesson content may be drag-able by the user. As further examples, a portion of the lesson content may be visually altered (e.g., by changing the color) as audio corresponding to the lesson content is output and/or a color of a portion of the background may be modified. Additionally, a portion of the lesson content may be replaced with user input fields for receiving answer input. In such examples, words from text in the lesson content may be replaced with a drop-down menu for selecting the correct word from multiple choices.

Figure 7:
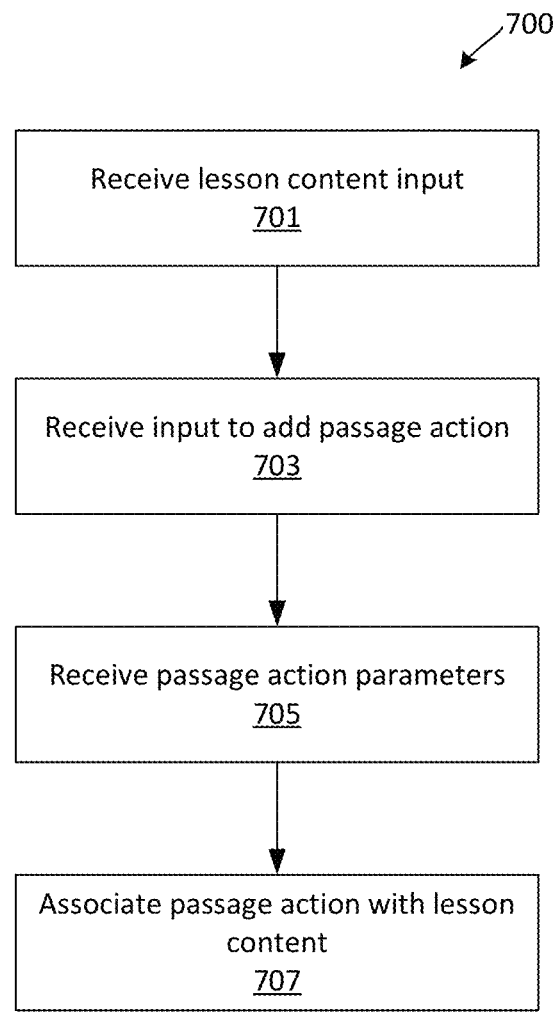
FIG. 7 is a flowchart of an illustrative process for editing lesson content, in accordance with some embodiments of the technology described herein.

FIG. 7 shows an illustrative process flow 700 for editing lesson content, in accordance with some embodiments of the technology described herein. The process flow 700 may be performed by a passage editor interface (e.g. 105A&B, 205, and/or 405).

At act 701, lesson content input is received. An author of lesson content may input one or more passages including text and/or audio-visual presentations. The lesson content may include multiple activities, such as multiple choice questions, for the user.

At act 703, input to receive a passage actions is received. For example, a button to add a passage action and a passage action editor were described with reference to FIGS. 4B and 5A-E. At act 705, passage action parameters are received. The passage action parameters may include event triggers for performing and/or modifying the action. For example, the passage action parameters may include an event trigger for performing the action and a second event trigger for removing the effect of the action. As a further example, an action may be performed at a predetermined point in an audio visual presentation and the effect may be removed at a second predetermined point. As another example, the passage action may be performed in response to any or all of a sequence of user inputs. The passage action parameters may include a type of visual effect and display parameters related to the visual effect. The passage action parameters may include a range of the lesson content to be affected by the visual effect.

At act 707, the passage action is associated with the lesson content. The lesson content and the associated passage action may be presented to one or more users, for example via a passage reader interface.

Figure 8:
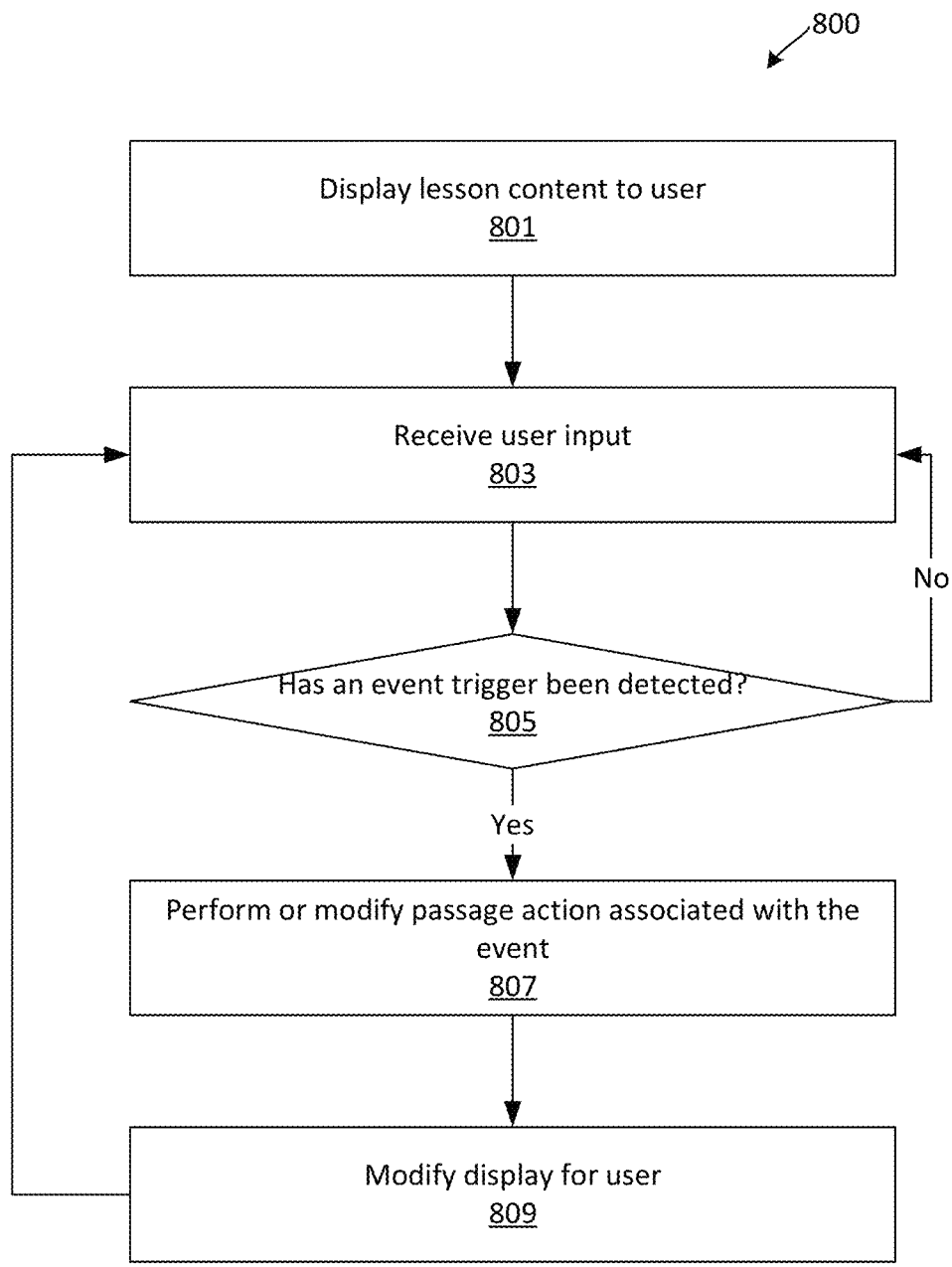
FIG. 8 is a flowchart of an illustrative process for editing lesson content, in accordance with some embodiments of the technology described herein.

FIG. 8 shows an illustrative process flow 800 for editing lesson content, in accordance with some embodiments of the technology described herein. The process flow 800 may be performed by a passage reader interface (e.g. 107A&B and 307).

At act 801, lesson content is displayed to a user. Lesson content may be displayed through a passage reader interface and a suitable computing device. At act 803, user input is received. The user input may relate to any suitable user interaction with the lesson content. For example, the user input may include, but is not limited to, control inputs of an audio-visual presentation, answers to a question, or any suitable input.

At act 805, it is determined whether an event trigger has been detected. The event trigger may be specified by the author of the lesson content. The user input, audio-visual playback, and/or passage of time may trigger events. If no event is triggered, the process flow loops until an event trigger is detected.

At act 807, a passage action associated with the event trigger is performed or modified. For example, the passage action may be performed and add a visual effect to the display, the visual effect may be modified, and/or the visual effect may be removed. In some embodiments, visual effects may be implemented in a display container element, such as an HTML div element. In some embodiments, the HTML div element is generated when the action is performed and deleted when the action is removed. In some embodiments, the visual effect is positioned in the display based on a positional range specified in metadata associated with the passage action and information related to the user display and the document object model representing the lesson content. In some embodiments, one action may modify, remove, and/or trigger one or more additional actions.

At act 809, the display is modified for the user. For example, the passage action may be used to generate a modified HTML document that is displayed to the user.

Figure 9:
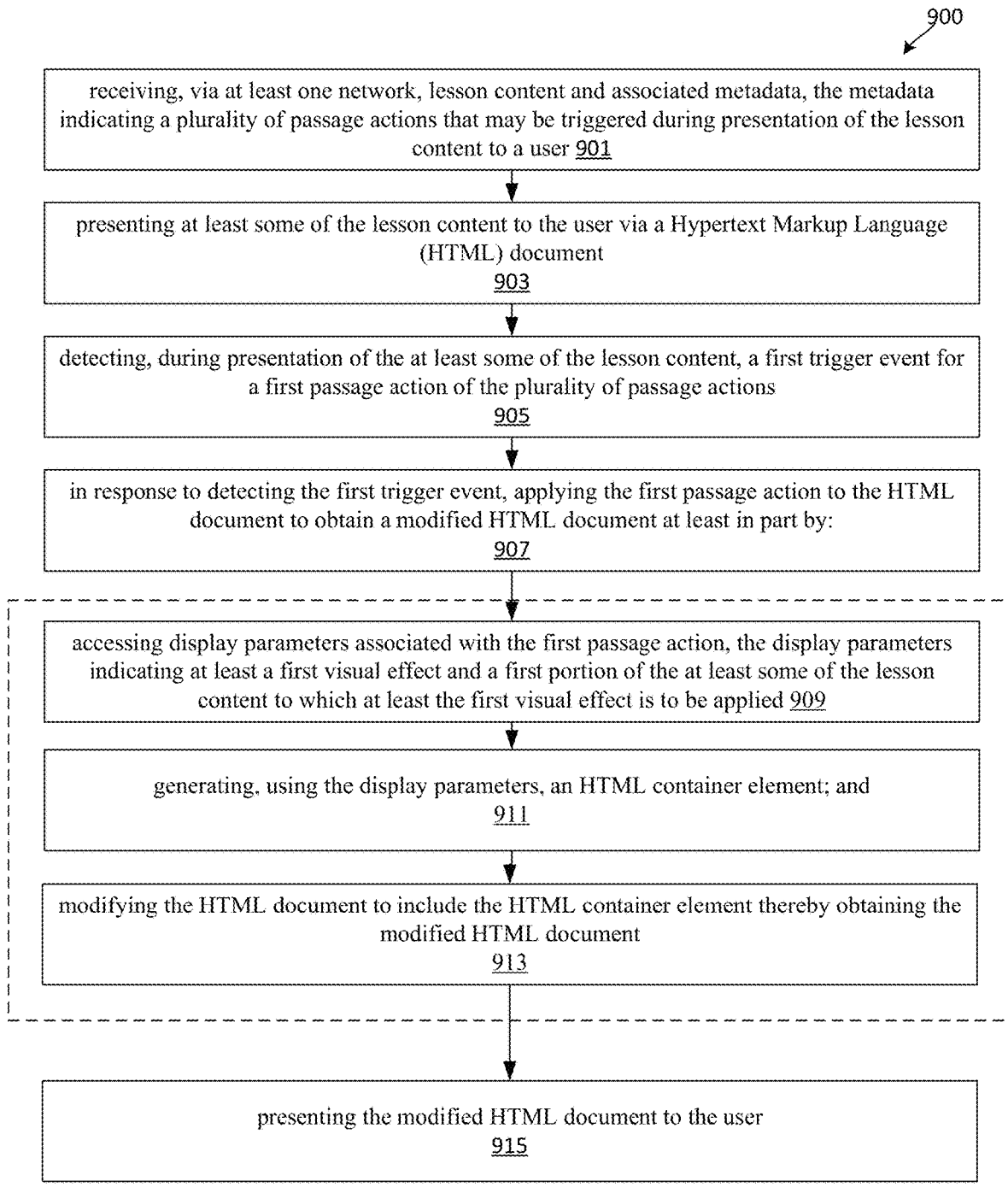
FIG. 9 is a flowchart of an illustrative process for displaying and modifying lesson content, in accordance with some embodiments of the technology described herein.

FIG. 9 shows an illustrative process flow 900 displaying and modifying lesson content, in accordance with some embodiments of the technology described herein. The process flow 900 may be performed by the systems described herein (e.g., passage reader interface 107A&B and 307).

At act 901, via at least one network, lesson content and associated metadata are received, the metadata indicating a plurality of passage actions that may be triggered during presentation of the lesson content to a user. In some embodiments, for each of the plurality of passage actions, the metadata specifies at least one trigger event for the passage action. In some embodiments, user input indicating the plurality of passage actions and one or more associated trigger events are received through a graphical user interface for authoring lesson content. In some embodiments, the metadata is generated using the received user input indicating the plurality of passage actions and the one or more associated trigger events.

At act 903, at least some of the lesson content may be presented to the user via a Hypertext Markup Language (HTML) document. In some embodiments, the HTML document comprises a webpage, and wherein the presenting comprises: presenting the webpage to the user using an Internet browser.

At act 905, during presentation of the at least some of the lesson content, a first trigger event for a first passage action of the plurality of passage actions may be detected. In some embodiments, the first trigger event indicates a first user input in response to which the first passage action is to be triggered, wherein the first passage action is applied in response to detecting the first user input. In some embodiments, the lesson content includes a question and the first trigger event comprises an incorrect answer to the question, wherein the first passage action is applied in response to detecting the incorrect answer to the question. In some embodiments, the first trigger event comprises a user's selection of a selectable display element, wherein the first passage action is applied in response to detecting the user's selection of the selectable display element. In some embodiments, the selectable display element is a button, a checkbox, a radio button, or a drop-down selector.

In some embodiments, the lesson content includes an audio presentation, and wherein the first trigger event is the audio playback of a specified point in the audio presentation. In some embodiments, the lesson content includes an video presentation, and wherein the first trigger event is the audio playback of a specified point in the video presentation.

In some embodiments, the first passage action is selected from the group of passage actions consisting of: displaying a container around at least a portion of the lesson content, causing at least a portion of the lesson content to be selectable by a user, causing at least a portion of lesson content to be movable by the user, animating at least a portion of the lesson content, highlighting at least a portion of the lesson content, revealing a hidden portion of the lesson content, underlining a portion of the lesson content, causing audio corresponding to at least a portion of the lesson content to be played, replacing at least a portion of the lesson content with an interactive display element, changing a color of at least a portion of the lesson content, and changing a background color of at least a portion of the lesson content.

In some embodiments, the lesson content comprises text, and the first passage action is selected from the group of passage actions consisting of: displaying a container around the text, causing the text to be selectable by a user, causing the text to be movable by the user, animating the text, highlighting the text, revealing the text when the text is previously hidden from the user's view, underlining the text, causing audio corresponding to the text to be played, replacing the text with an interactive display element, changing color of the text, and changing a color in a background of the text.

At act 907, in response to detecting the first trigger event, the first passage action may be applied to the HTML document to obtain a modified HTML document at least in part by performing acts 909, 911, and 913.

At act 909, display parameters associated with the first passage action may be accessed, the display parameters indicating at least a first visual effect and a first portion of the at least some of the lesson content to which at least the first visual effect is to be applied.

At act 911, using the display parameters, an HTML container element may be generated. In some embodiments, generating, using the display parameters, the HTML container element comprises generating an HTML div element having parameters that will cause the HTML div element to contribute to display of at least the first visual effect when presented as part of the modified HTML document.

At act 913, the HTML document may be modified to include the HTML container element thereby obtaining the modified HTML document.

At act 915, the modified HTML document is presented to the user.

In some embodiments, the process flow 900 may further include the acts of detecting, during presentation of the at least some of the lesson content, a second trigger event for a second passage action of the plurality of passage actions; in response to detecting the second trigger event, applying the second passage action at least in part by: accessing second display parameters associated with the second passage action, the second display parameters indicating at least a second visual effect and a second portion of the at least some of the lesson content to which at least the second visual effect is to be applied; generating a second HTML container element using the second display parameters; and modifying the HTML document to include the second HTML container thereby obtaining a second modified HTML document; and presenting the second modified HTML document to the user. In some embodiments, the second portion at least partially overlaps the first portion of the at least some of the lesson content. In some embodiments, the second portion does not overlap with the first portion of the at least some of the lesson content.

Aspects of the technology described herein may provide one or more benefits, some of which have been previously described. Now described are some non-limiting examples of such benefits. It should be appreciated that not all aspects and embodiments necessarily provide all of the benefits now described. Further, it should be appreciated that aspects of the technology described herein may provide additional benefits to those now described.

Aspects of the technology described herein provide a system for displaying and modifying interactive lesson content. The system allows for visual effects to be dynamically generated, controlled, and layered in a display with improved precision. This improves the ease of use and expressiveness of conventional approaches for publishing interactive content. The above-described embodiments of the technology described herein may be implemented in any of numerous ways. For example, the embodiments may be implemented using hardware, software, or a combination of hardware and software. When implemented in software, the software code may be executed on any suitable processor or collection of processors, whether provided in a single computer or distributed among multiple computers.

Such computers may be interconnected by one or more communication media (e.g., networks) in any suitable form, including a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

Figure 10:
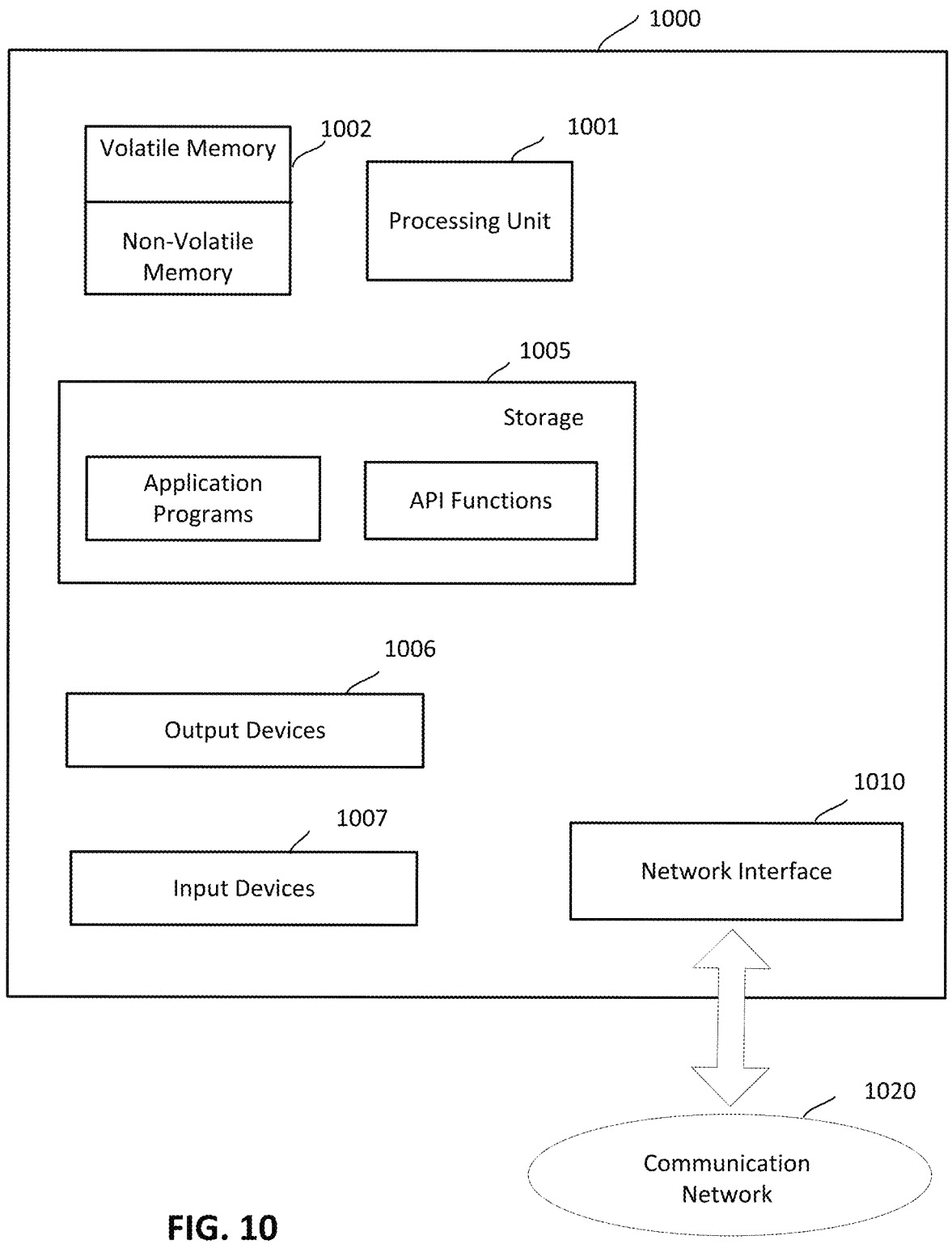
FIG. 10 shows an illustrative implementation of a computer system that may be used in connection with any of the embodiments of the technology described herein.

An illustrative implementation of a computer system 1000 that may be used in connection with any of the embodiments of the technology described herein is shown in FIG. 10. The computer system 1000 may include one or more processors 1010 and one or more articles of manufacture that comprise non-transitory computer-readable storage media (e.g., memory 1020 and one or more non-volatile storage media 1030). The processor 1010 may control writing data to and reading data from the memory 1020 and the non-volatile storage device 1030 in any suitable manner, as the aspects of the technology described herein are not limited in this respect. To perform any of the functionality described herein, the processor 1010 may execute one or more processor-executable instructions stored in one or more non-transitory computer-readable storage media (e.g., the memory 1020), which may serve as non-transitory computer-readable storage media storing processor-executable instructions for execution by the processor 1010.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the technology described herein need not reside on a single computer or processor, but may be distributed in a modular fashion among different computers or processors to implement various aspects of the technology described herein.

Processor-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided, including with reference to FIGS. 7, 8, and 9. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having thus described several aspects of at least one embodiment of the technology, it is to be appreciated that various alterations, modifications, and improvements will readily occur to those skilled in the art. Such alterations, modifications, and improvements are intended to be part of this disclosure, and are intended to be within the spirit and scope of the disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

What is claimed is:

1. At least one non-transitory computer-readable storage medium storing processor-executable instructions that, when executed by at least one computer hardware processor, cause the at least one computer hardware processor to perform:

receiving, via at least one network, lesson content and associated metadata, the metadata indicating a plurality of passage actions that may be triggered during presentation of the lesson content to a user;

presenting at least some of the lesson content to the user via a Hypertext Markup Language (HTML) document;

detecting, during presentation of the at least some of the lesson content, a first trigger event for a first passage action of the plurality of passage actions;

applying the first passage action to the HTML document in response to detecting the first trigger event to obtain a modified HTML document, the applying comprising:

in response to detecting the first trigger event, creating a new HTML container element using display parameters associated with the first passage action; and inserting the new HTML container element created in response to detecting the first trigger event into the HTML document to obtain the modified HTML document, wherein the display parameters associated with the first passage action indicate at least a first visual effect and a first portion of the at least some of the lesson content to which at least the first visual effect is to be applied;

and presenting the modified HTML document to the user.

2. The at least one non-transitory computer-readable storage medium of claim 1, wherein the HTML document comprises a webpage, and wherein the presenting comprises:

presenting the webpage to the user using an Internet browser.

3. The at least one non-transitory computer-readable storage medium of claim 1, wherein creating, using the display parameters, the new HTML container element comprises:

generating an HTML div element having parameters that will cause the HTML div element to visually contribute to display of at least the first visual effect when presented as part of the modified HTML document.

4. The at least one non-transitory computer-readable storage medium of claim 1, wherein the processor-executable instructions further cause the at least one computer hardware processor to perform:

detecting, during presentation of the at least some of the lesson content, a second trigger event for a second passage action of the plurality of passage actions;

applying the second passage action to the HTML document in response to detecting the second trigger event to obtain a second modified HTML document, the applying comprising:

in response to detecting the second trigger event, creating a second new HTML container element using second display parameters associated with the second passage action; and inserting the second new HTML container element created in response to detecting the second trigger event into the HTML document to obtain the second modified HTML document, wherein the second display parameters associated with the second passage action indicate at least a second visual effect and a second portion of the at least some of the lesson content to which at least the second visual effect is to be applied; and presenting the second modified HTML document to the user.

5. The at least one non-transitory computer-readable storage medium of claim 4, wherein the second portion at least partially overlaps the first portion of the at least some of the lesson content.

6. The at least one non-transitory computer-readable storage medium of claim 4, wherein the second portion does not overlap with the first portion of the at least some of the lesson content.

7. The at least one non-transitory computer-readable storage medium of claim 1, wherein, for each of the plurality of passage actions, the metadata specifies at least one trigger event for the passage action.

8. The at least one non-transitory computer-readable storage medium of claim 1, wherein the first trigger event indicates a first user input in response to which the first passage action is to be triggered, wherein the first passage action is applied in response to detecting the first user input.

9. The at least one non-transitory computer-readable storage medium of claim 8, wherein the lesson content includes a question and the first trigger event comprises an incorrect answer to the question, wherein the first passage action is applied in response to detecting the incorrect answer to the question.

10. The at least one non-transitory computer-readable storage medium of claim 8, wherein the first trigger event comprises a user's selection of a selectable display element, wherein the first passage action is applied in response to detecting the user's selection of the selectable display element.

11. The at least one non-transitory computer-readable storage medium of claim 10, wherein the selectable display element is a button, a checkbox, a radio button, or a drop-down selector.

12. The at least one non-transitory computer-readable storage medium of claim 1, wherein the lesson content includes an audio presentation, and wherein the first trigger event is the audio playback of a specified point in the audio presentation.

13. The at least one non-transitory computer-readable storage medium of claim 1, wherein the lesson content includes a video presentation, and wherein the first trigger event is the audio playback of a specified point in the video presentation.

14. The at least one non-transitory computer-readable storage medium of claim 1, wherein the first trigger event is a passage of a threshold amount of time after presentation of a specified piece of content.

15. The at least one non-transitory computer-readable storage medium of claim 1, wherein the first passage action comprises displaying a container around at least a portion of the lesson content, causing at least a portion of the lesson content to be selectable by a user, causing at least a portion of lesson content to be movable by the user, animating at least a portion of the lesson content, highlighting at least a portion of the lesson content, revealing a hidden portion of the lesson content, underlining a portion of the lesson content, causing audio corresponding to at least a portion of the lesson content to be played, replacing at least a portion of the lesson content with an interactive display element, changing a color of at least a portion of the lesson content, and/or changing a background color of at least a portion of the lesson content.

16. The at least one non-transitory computer-readable storage medium of claim 1, wherein the lesson content comprises text, and the first passage action comprises displaying a container around the text, causing the text to be selectable by a user, causing the text to be movable by the user, animating the text, highlighting the text, revealing the text when the text is previously hidden from the user's view, underlining the text, causing audio corresponding to the text to be played, replacing the text with an interactive display element, changing color of the text, and/or changing a color in a background of the text.

17. The at least one non-transitory computer-readable storage medium of claim 1, wherein the processor-executable instructions further cause the at least one computer hardware processor to perform:
receiving, through a graphical user interface for authoring lesson content, user input indicating the plurality of passage actions and one or more associated trigger events.

18. The at least one non-transitory computer-readable storage medium of claim 17, wherein the processor-executable instructions further cause the at least one computer hardware processor to perform:
generating the metadata using the received user input indicating the plurality of passage actions and the one or more associated trigger events.

19. A system, comprising:
at least one computer hardware processor; and
at least one non-transitory computer-readable storage medium storing processor-executable instructions that, when executed by the at least one computer hardware processor, cause the at least one computer hardware processor to perform:
receiving, via at least one network, lesson content and associated metadata, the metadata indicating a plurality of passage actions that may be triggered during presentation of the lesson content to a user;
presenting at least some of the lesson content to the user via a Hypertext Markup Language (HTML) document;
detecting, during presentation of the at least some of the lesson content, a first trigger event for a first passage action of the plurality of passage actions;
applying the first passage action in response to detecting the first trigger event, to obtain a modified HTML document, the applying comprising:
in response to detecting the first trigger event, creating a new HTML container element using display parameters associated with the first passage action; and
inserting the new HTML container element created in response to detecting the first trigger event into the HTML document to obtain the modified HTML document,
wherein the display parameters associated with the first passage action indicate at least a first visual effect and a first portion of the at least some of the lesson content to which at least the first visual effect is to be applied;
and
presenting the modified HTML document to the user.

20. The system of claim 19, wherein creating, using the display parameters, the new HTML container element comprises:
generating an HTML div element having parameters that will cause the HTML div element to visually contribute to the display of at least the first visual effect when presented as part of the modified HTML document.

21. The system of claim 19, wherein the processor-executable instructions further cause the at least one computer hardware processor to perform:
detecting, during presentation of the at least some of the lesson content, a second trigger event for a second passage action of the plurality of passage actions;

applying the second passage action to the HTML document in response to detecting the second trigger event to obtain a second modified HTML document, the applying comprising:
   in response to detecting the second trigger event, creating a second new HTML container element using second display parameters associated with the second passage action; and
   inserting the second new HTML container element created in response to detecting the second trigger event into the HTML document to obtain the second modified HTML document,
   wherein the second display parameters associated with the second passage action indicate at least a second visual effect and a second portion of the at least some of the lesson content to which at least the second visual effect is to be applied; and
presenting the second modified HTML document to the user.

22. The system of claim 21, wherein the second portion at least partially overlaps the first portion of the at least some of the lesson content.

23. A method, comprising:
using at least one computer hardware processor to perform:
   receiving, via at least one network, lesson content and associated metadata, the metadata indicating a plurality of passage actions that may be triggered during presentation of the lesson content to a user;
   presenting at least some of the lesson content to the user via a Hypertext Markup Language (HTML) document;
   detecting, during presentation of the at least some of the lesson content, a first trigger event for a first passage action of the plurality of passage actions;
   applying the first passage action to the HTML document in response to detecting the first trigger event to obtain a modified HTML document, the applying comprising:
     in response to detecting the first trigger event, creating a new HTML container element using display parameters associated with the first passage action; and
     inserting the new HTML container element created in response to detecting the first trigger event into the HTML document to obtain the modified HTML document,
     wherein the display parameters associated with the first passage action indicate at least a first visual effect and a first portion of the at least some of the lesson content to which at least the first visual effect is to be applied; and presenting the modified HTML document to the user.

24. The method of claim 23, wherein creating, using the display parameters, the new HTML container element comprises:
generating an HTML div element having parameters that will cause the HTML div element to visually contribute to the display of at least the first visual effect when presented as part of the modified HTML document.

25. The method of claim 23, further comprising using the computer hardware processor to perform:
detecting, during presentation of the at least some of the lesson content, a second trigger event for a second passage action of the plurality of passage actions;
applying the second passage action to the HTML document in response to detecting the second trigger event to obtain a second modified HTML document, the applying comprising:
   in response to detecting the second trigger event, creating a second new HTML container element using second display parameters associated with the second passage action; and
   inserting the second new HTML container element created in response to detecting the second trigger event into the HTML document to obtain the second modified HTML document,
   wherein the second display parameters associated with the second passage action indicate at least a second visual effect and a second portion of the at least some of the lesson content to which at least the second visual effect is to be applied; and
presenting the second modified HTML document to the user.

26. The method of claim 25, wherein the second portion at least partially overlaps the first portion of the at least some of the lesson content.

* * * * *

UNITED STATES PATENT AND TRADEMARK OFFICE
CERTIFICATE OF CORRECTION

PATENT NO. : 10,878,171 B2  
APPLICATION NO. : 16/216870  
DATED : December 29, 2020  
INVENTOR(S) : Nolan Madge et al.

Page 1 of 1

It is certified that error appears in the above-identified patent and that said Letters Patent is hereby corrected as shown below:

On the Title Page

In item (71), Applicant, please replace:
"Curriculum Associates, Inc., North Billerica, MA (US)"

With:
-- Curriculum Associates, LLC, North Billerica, MA (US) --

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*